No. 806,396. PATENTED DEC. 5, 1905.
A. B. CLUNIES.
GRATE.
APPLICATION FILED JULY 1, 1903.
2 SHEETS—SHEET 2.
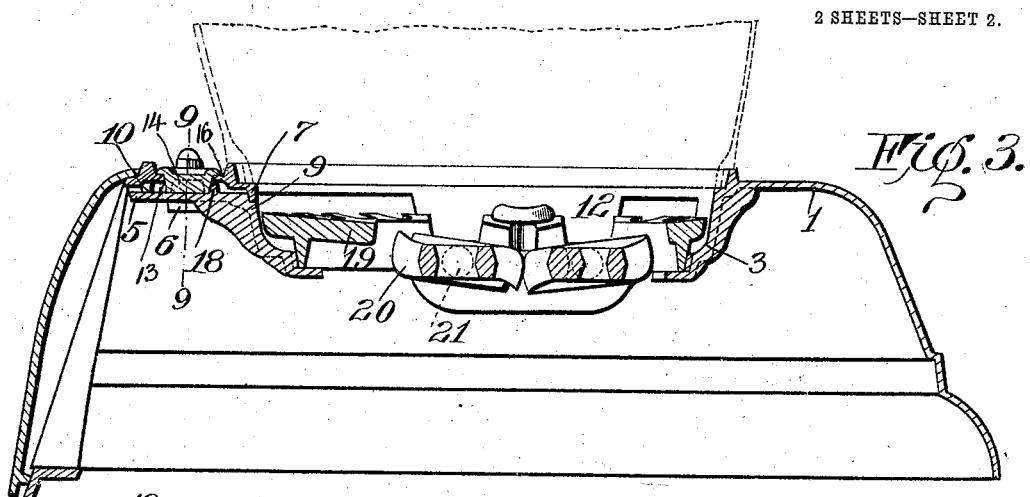
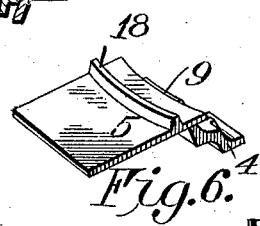
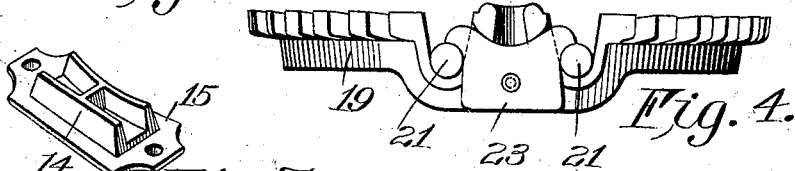
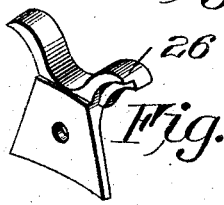
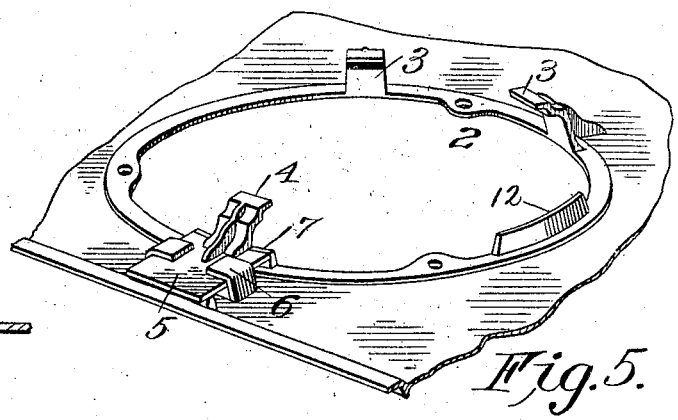
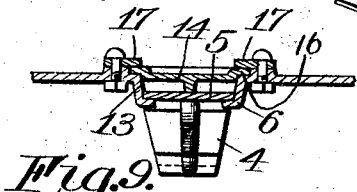
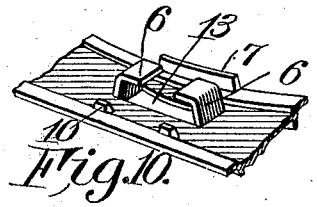
Witnesses.
Walter B. Payne
Clarence A. Bateman.
Inventor.
Arthur B. Clunies
by
Frederick H. Church
Attorney

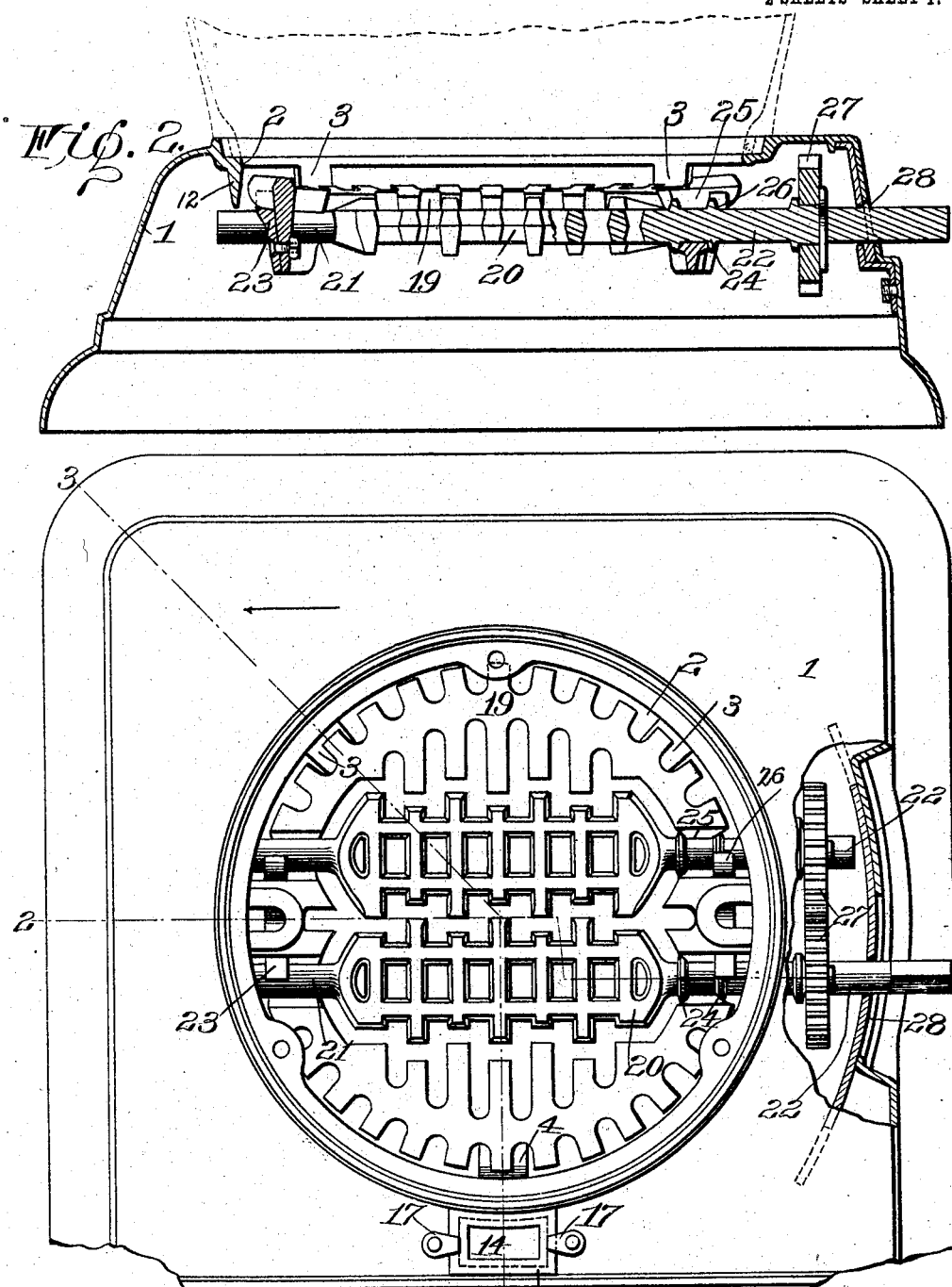

UNITED STATES PATENT OFFICE.

ARTHUR B. CLUNIES, OF ROCHESTER, NEW YORK, ASSIGNOR TO SILL STOVE WORKS, OF ROCHESTER, NEW YORK, A CORPORATION OF NEW YORK.

GRATE.

No. 806,396.

Specification of Letters Patent.

Patented Dec. 5, 1905.

Application filed July 1, 1903. Serial No. 163,880.

*To all whom it may concern:*

Be it known that I, ARTHUR B. CLUNIES, of the city of Rochester, in the county of Monroe and State of New York, have invented certain new and useful Improvements in Grates; and I do hereby declare the following to be a full, clear, and exact description of the same, reference being had to the accompanying drawings, forming a part of this specification, and to the reference-numerals marked thereon.

My present invention relates to grate structures especially adapted for use in connection with stoves and analogous devices, and has for its object the production of a structure of this character wherein the grate may be readily inserted and effectively supported and in which the grate-bars carried by said grate may be securely locked in position to eliminate the possibility of displacement.

Other features of novelty and advantage will be hereinafter more fully explained, and pointed out in the claims hereunto annexed.

In the drawings, Figure 1 is a plan view of a grate embodying my invention, parts being broken away for clearness in illustration. Fig. 2 is a sectional view thereof, taken on the line 2 2 of Fig. 1. Fig. 3 is a similar view taken along the line 3 3 of Fig. 1 and looking in the direction of the arrows. Fig. 4 is a view showing the grate detached. Fig. 5 is an underneath view of the grate-supports. Fig. 6 is a detail view of the movable grate-support. Fig. 7 is a similar view showing the under side of the locking member. Fig. 8 is a detail view of the grate-bar retainer. Fig. 9 is a fragmentary sectional view taken along the line 9 9 of Fig. 3; and Fig. 10 is a view of the supporting devices for the locking member viewed from beneath, parts being removed.

In the views the same numerals of reference designate similar parts.

In the present embodiment of my invention, 1 designates a supporting casing or frame, either forming part of the stove or an independent structure. This casing is provided with an aperture 2, and adjacent the periphery of this aperture are formed grate-supports 3 3, a movable support 4 being also provided in proximity to said aperture. The support 4 is preferably provided with an extension 5, adapted to be embraced by the lugs 6 6, an abutment 7 being provided, against which the movable support rests while in position, a recess 9 being provided thereon to receive said abutment. Projections 10 10 may also be provided, if desired, for holding the movable support 4 in position. Beneath the casing 1 is provided an abutment 12, the purpose of which will hereinafter more fully appear.

13 is an aperture formed in the casing 1, and into this aperture is fitted a block 14, provided with a flange 15, adapted to rest in a recess 16, pivoted lugs 17 17 being provided for retaining said block in position. This block 14 when in the position shown in Fig. 3 will rest against a projection 18 upon the movable grate-support 4 to retain the latter against movement. As motion in the opposite direction is prevented by the abutment 7, the movable support 4 will thus be securely locked in position.

In placing the grate in position the support 4 is removed and the grate placed upon the supports 3 3 from beneath. When in proper position, the movable support 4 is moved into position and the block 14 inserted into the aperture 13 in such a manner that said block will rest against the projection 18, after which the retaining-lugs 17 17 may be turned to confine said block.

The grate in the present instance comprises a grate-frame 19 and grate-bars 20, the former being preferably recessed to receive the grate-bars 20 20, the latter being of any suitable construction, the structure shown in the present embodiment comprising grate-bars having journals 21 21, resting in recesses in one side of the grate-frame, and similar journals 22 22, resting in similar recesses at the opposite side of the grate-frame. Embracing the journals 21 21 is a yoke 23, secured in any suitable manner to the grate-frame to retain said journals from displacement. The journals 22 22 are each provided with thrust collars or members 24 24, between and embracing which are the bearings 25 25, carried by the grate-frame to prevent longitudinal motion of said grate-bars, and a retaining-yoke 26 is also provided embracing the journals 22 22 to prevent displacement thereof.

Gearing or other power-transmitting mechanism 27 is preferably interposed between the grate-bars 19 19, one of the journals 22 extending through the slot 28 of the casing and being provided with a squared or other suitably-shaped portion to receive a wrench or the like for rotating said bars and swinging said grate in a horizontal plane.

To prevent displacement of the grate, the abutment 12 is provided, bearing upon the journals 21 21 at one side of the grate, the limited motion of the journals 22 in the aperture 28 being utilized to retain the grate in position at the opposite side.

Thus it will be seen that a grate structure is provided wherein the grate-frame will be securely held down by the grate-bars, which in turn are held in place by the overhanging edges or portions of the supporting-frame, which engage the ends or journals in such a way that the grate may be rotated in a horizontal plane and grate-bars carried by the grate-frame revolved independently of one another. Moreover, as the abutment 12 is arranged at the rear of the grate-aperture and intermediately of the movable and fixed supports, the grate in being swung into position with one side of the frame resting on the fixed supports will cause the rear journals of the grate-bars to engage this abutment from beneath, and when the movable support is locked in position the grate-bars and the frame on which they rest will be held from displacement.

I claim as my invention—

1. In a stove, the combination with the casing having supporting devices for supporting the grate at one side, and a grate adapted to rest thereon, of a relatively movable support mounted in ways on the casing opposite said supporting devices and arranged to engage the grate to support it, and a locking device movable transversely of the ways for retaining the movable support in engagement with the grate.

2. The combination with a stove having fixed supports thereon, and an additional support movable in relation to the said fixed supports, and a relatively fixed retaining-abutment located intermediately of the fixed and movable supports, of a grate embodying a frame adapted to rest upon said supports and arranged to be locked in position by the movable support, and having movable grate members thereon having portions adapted to engage said abutment when the grate is swung about the fixed supports to prevent the displacement of said movable grate members.

3. In a stove, the combination with the casing provided with a circular grate-aperture, a fixed support arranged at one side of the aperture, a movable support arranged opposite to the fixed support, and a curved retaining-abutment arranged at the edge of the aperture intermediately of the fixed and movable supports, of a grate embodying a frame rotatable horizontally on the fixed and movable supports, and having grate members loosely mounted thereon and coöperating with said abutment to prevent their displacement.

4. In a stove, the combination with the casing provided with a fixed support, and a grate adapted to rest thereon, of a movable support mounted to coöperate with the grate to support it in position, and a locking device movable in a direction transversely of the direction of motion of the movable support for retaining the latter in coöperative relation with the grate.

5. In a stove, the combination with the casing having a support formed thereon, and a grate adapted to fit within the casing and arranged to rest at one side upon said support, of a support capable of being moved into and out of coöperative relation with the grate to support the latter in position, and a locking device movable in a direction transversely of the direction of motion of the movable support for locking the latter in coöperative relation with the grate.

6. In a stove, the combination with the casing provided with a fixed support and an aperture, and a grate adapted to fit within the casing and arranged to rest at one side upon said support, of a locking-support capable of being moved into and out of coöperative relation with the grate for supporting the latter in operative position, and a removable locking device resting in said aperture in the casing and coöperating with the locking-support for retaining the latter in coöperative relation with the grate.

7. The combination with a stove having fixed supporting members adapted to engage a portion of a grate and provided with a recess, of a movable member slidingly mounted in relation to the fixed members and carrying a laterally-disposed projection thereon, and a locking device for said member adapted to be inserted in said recess in the stove and coöperate with the projection upon said movable member for retaining said movable member in locked position.

8. In a stove, the combination with a grate and a casing therefor having an aperture, of a relatively fixed support carried by the stove upon which a portion of the grate is adapted to rest and a relatively movable support having a projection upon which a portion of the grate rests and arranged to be withdrawn laterally from the grate, and a locking device confined within said aperture in the stove for retaining the movable support in its locked position.

9. In a stove, the combination with the casing having a grate-aperture formed therein and a recess arranged adjacent to said aperture, of fixed supports arranged on the casing at one side of the grate-aperture, a slidable support operating past the recess in the casing and having a projection thereon, a movable locking device resting in said recess and coöperating with the projection on the slidable support to lock the latter in operative position, and a grate mounted on said supports.

10. In a stove, the combination with a grate, of means for supporting the grate at one side, a slidable support mounted in ways in the stove-casing and arranged to engage the grate to support it at its opposite side, a projection being provided on said support, and a locking device movable transversely of the ways and adapted to engage said projection to retain said movable support in its locked position.

11. In a stove, the combination with a grate the casing inclosing it and having a recess, and means for supporting one side of the grate, of a movable support slidingly mounted in ways on the casing and adapted to project beneath the grate for supporting the opposite side thereof, a projection being provided on the movable support, and a locking device adapted to enter said recess in the stove-casing and rest against said projection to retain the movable support in engagement with the grate, and retaining devices for preventing the displacement of the locking device.

12. In a stove, the combination with a grate, the casing having an opening beneath which the grate rests and relatively fixed supports carried by the casing for supporting the grate at one side, of a relatively movable support mounted in ways in the casing and having a portion arranged to engage the grate to support it when in position, an abutment for limiting the motion of said movable support toward the grate, and a locking device movable transversely of the ways for retaining said support in engagement with the grate.

ARTHUR B. CLUNIES.

Witnesses:
G. WILLARD RICH,
CLARENCE A. BATEMAN.